March 31, 1970
L. MARIANELLI
3,503,096
CONTINUOUS-FLOW FILTER FOR EXTRUDERS AND SIMILAR
MACHINES FOR PROCESSING PLASTIC MATERIALS
Filed Feb. 2, 1968
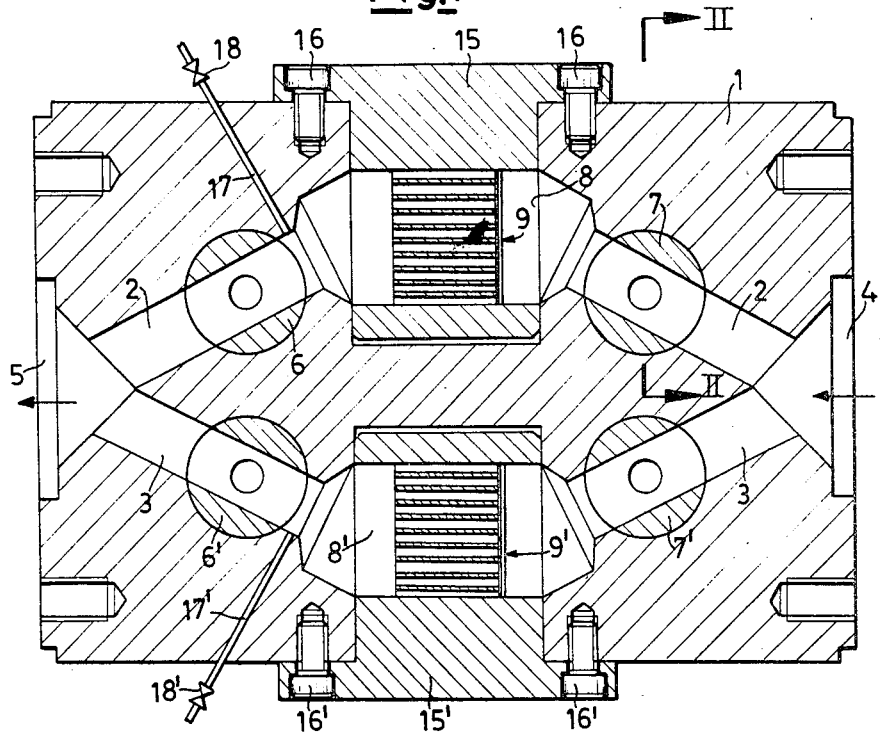
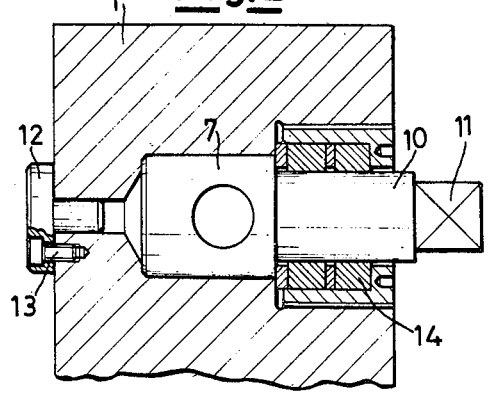
INVENTOR.
Luigi Marianelli United States Patent Office 3,503,096
Patented Mar. 31, 1970

3,503,096
CONTINUOUS-FLOW FILTER FOR EXTRUDERS AND SIMILAR MACHINES FOR PROCESSING PLASTIC MATERIALS
Luigi Marianelli, Via Risorgimento 1, Sesto San Giovanni, Milan, Italy
Filed Feb. 2, 1968, Ser. No. 702,677
Claims priority, application Italy, Feb. 6, 1967, 12,320/67
Int. Cl. B29f *3/03;* D01d *1/10*
U.S. Cl. 18—12                                    2 Claims

ABSTRACT OF THE DISCLOSURE

A filtering assembly for extruders of plastic materials is disclosed, which comprises two shunted channels inserted between the inlet and the outlet for said plastic material, said channels having, each, a filtering member inserted in a chamber positioned roughly midway of each channel. Stopcocks are also provided for bypassing either filtering member whenever this is necessary for repair, cleaning or replacement purposes.

---

The necessity is known of filtering the plastic material which must pass from the compression chamber of an extruder to the extrusion head, in order to avoid the chance that impurities possibly contained in the plastic material may clog the extrusion head or somehow hinder its regular operation.

It is possible to insert a conventional filter between the mouth of the press and the extruder but the operation of the extruder must be stopped.

Furthermore, another problem which is often encountered is that, after cleaning the filter, as the machine is brought back to its operation, the air present in the chamber in which the filter is housed is a cause of irregular spots, which are sometimes considerable, at the start of the extruded piece.

The object of the present invention is to do away with the above enumerated shortcomings and to make the cleaning of the filter possible whenever necessary, without having to stop the press or discontinuing the flow of plastic material towards the extruder head.

The subject matter of the invention is a filter for an extruder or a similar machine, which can be inserted between the outlet of the press and the inlet of the extruder head, characterized in that it comprises a body having two internal channels or flow passageways shunted between the single inlet port and the single outlet port, each of said chambers housing a filter and two stopcocks, independent of one another, one upstream and the other downstream of said chamber, said chamber communicating with the outside by means of an opening formed through said body and capable of being closed in a sealtight manner and adapted to permit access to the filter for cleaning or replacing it. By closing the two stopcocks of either channel, the interposed filter can be cleaned without interrupting the flow which is continued through the other filter.

Means are further provided for venting air for each chamber in which a filter is housed, said means being adapted to permit, immediately after the cleaning of the attendant filter, the discharge of air present therein when said filter is inserted in operative position when feeding the extruder so as to forward to the extrusion head a plastic material in a condition which is appropriate for extrusion without defects.

For greater clarity reference is made hereinafter to the embodiment illustrated by way of example in the accompanying drawings, wherein:

FIG. 1 shows a longitudinal cross-sectional view of the inventive filter.

FIG. 2 shows a cross-sectional view taken along the line II—II of FIG. 1.

The shunt filter according to the invention comprises a body 1 having internally two channels 2, shunted between the port 4 through which the plastic material is fed under pressure and the port 5 through which said filtered material passes to the extruding head (not shown in the drawings).

In the path of each of the two channels 2 and 3, two stopcocks 6, 7 (and 6', 7') are mounted, rotatable about their axes and positioned, one upstream and the other downstream of the chamber 8 (8') in which the filtering member 9 (9') is housed.

The cocks such as 7 (FIG. 2) can be manipulated from the outside by acting upon the square head 11 of the stem 10 which emerges from the body through sealtight members 14. The numeral 12 indicates, a plug, fastened with screws 13, which closes the stopcock bore on the side away of the stem 10.

Each chamber 8 (8') communicates with the outside through an opening formed in the side of the body 1 and closed by a plug 15 (15') which can be affixed to the body by bolts 16 (16'). In practice, the plug 15 itself has a through bore in which the filter 9 is housed. Thus, to clean or to replace either filter 9 (or 9'), for example the filter 9, it suffices to close the stopcocks 6 and 7 and remove the plug 15 with the filter 9, without thereby discontinuing the flow of material between 4 and 5, which takes place through the duct 3, the cocks 6' and 7' (opened) and the filter 9'. The numeral 17 (17') indicates two ducts (conduits) with valves 18 (18') for discharging the air of the filter when the channel is again operative upon cleaning.

More particularly, for example, when filter 9 has been cleaned and it is desired to put it in operation to allow the cleaning of the filter 9', the procedure is as follows:

The cock 7 is opened, whereas the cock 6 is kept closed and the valve 18 is opened. The mass of plastic material to be extruded fills the chamber 8 and passes through the filter 9, whereafter it passes through the duct 17 and comes out through the valve 18. Thus all the air present in the chamber 8 and the filter 9 is vented out. Then, the cock 6 is opened and the valve 18 closed, so that the inlet 5 of the extrusion head is fed with plastic material free from entrapped air.

What I claim is:

1. A filter for extruders or like machines for processing plastic materials comprising a body capable of being inserted between the outlet of a press and the inlet of an extruder head; said body having two separate internal passageways between a single inlet port and a single outlet port; a chamber being located along each passageway and housing a filtering member; two stopcocks also located in each passageway, one upstream and the other one downstream of said chamber; said chambers each communicating with the outside through an opening formed in said body and which is closeable by a sealing plug, thereby permitting access to said filter for servicing same; and a conduit downstream from each said filtering element communicating with the outside for venting air, said conduit containing a valve for opening and closing the communication with the outside.

2. A filter according to claim 1 wherein said conduit is positioned between each said chamber housing said filtering member and said stopcock on the downstream side of said chamber.

References Cited

UNITED STATES PATENTS

| | | | |
|---|---|---|---|
| 2,184,177 | 12/1939 | Burrell. | |
| 3,033,256 | 5/1962 | Schrenk | 18—12 XR |
| 3,059,276 | 10/1962 | Yokana | 18—12 |
| 3,146,494 | 9/1964 | Sponaugle | 18—12 |
| 2,243,849 | 4/1966 | Jonkainen | 18—12 |

FOREIGN PATENTS 684,976   4/1964   Canada.

WILLIAM J. STEPHENSON, Primary Examiner

U.S. Cl. X.R.

18—8; 146—174